United States Patent
Kaiser et al.

[11] 3,969,016
[45] July 13, 1976

[54] LOW-DISPERSION OPTICAL FIBER WAVE GUIDING STRUCTURES WITH PERIODICALLY DEFORMED WAVEGUIDE AXIS

[75] Inventors: Peter Kaiser, Middletown; Enrique Alfredo Jose Marcatili, Rumson, both of N.J.

[73] Assignee: Bell Telephone Laboratories, Incorporated, Murray Hill, N.J.

[22] Filed: May 9, 1975

[21] Appl. No.: 576,043

[52] U.S. Cl. ............................ 350/96 WG; 156/244
[51] Int. Cl.² ............................................. G02B 5/14
[58] Field of Search ............................... 350/96 WG

[56] References Cited
UNITED STATES PATENTS

| | | | |
|---|---|---|---|
| 3,666,348 | 5/1972 | Marcatili | 350/96 WG |
| 3,687,514 | 8/1972 | Miller et al. | 350/96 WG |
| 3,723,921 | 3/1973 | Rowe et al. | 350/96 WG |
| 3,830,640 | 8/1974 | Kitano et al. | 350/96 WG |
| 3,831,038 | 8/1974 | Dabby et al. | 350/96 WG |

*Primary Examiner*—John K. Cobin
*Assistant Examiner*—Stewart Levy
*Attorney, Agent, or Firm*—Thomas C. O'Konski; Bryan W. Sheffield

[57] ABSTRACT

The disclosure is directed to optical fiber waveguiding structures, and techniques for fabricating the same, which are designed to have reduced modal dispersion as a result of the deliberate enhancement of mode coupling in the fibers. The mode coupling is achieved in each of the structures by means of an enveloping outer jacket, typically of plastic, which is selectively deformed so as to modify the straightness of the fiber axes in a spatially periodic manner. Several alternative techniques are presented for properly deforming the outer jacket either before or after it is combined with the fibers. Since, with these structures and techniques, the outer jacket provides the desired fiber perturbations, the fibers themselves can be fabricated using standard techniques without the need for any special procedures for modifying their parameters.

3 Claims, 6 Drawing Figures

LOW DISPERSION OPTICAL FIBER WAVE GUIDING STRUCTURES WITH PERIODICALLY DEFORMED WAVEGUIDE AXIS

BACKGROUND OF THE INVENTION

This invention relates to optical fiber waveguiding structures and, more particularly to the design and fabrication of such structures with reduced modal dispersion.

It is well known that waveguides supportive of many guided modes suffer from modal dispersion. A pulse of wave energy launched into a multimode waveguide excites many modes, each traveling at a different group velocity. At the output end of the waveguide, the pulse is spread out in time by an amount that is proportional to the length of the guide because of the different group velocities of each mode. This pulse spreading, or dispersion, can severely limit the information-carrying capacity of a waveguide communication system, with the magnitude of the problem increasing with the length of the waveguide links.

In U.S. Pat. No. 3,687,614, it is shown that modal dispersion in multimode waveguides can be reduced by deliberately enhancing the mode coupling processes in the waveguide. Such mode coupling is accomplished by introducing controlled "imperfections" into the waveguide which tend to induce coupling among the various propagating modes. The greater the coupling, the greater the probability that the wave energy will be more uniformly distributed among all of the possible modes. As a result, the time it takes for all of the wave energy to traverse the entire length of the waveguide is more nearly the same. Thus, whereas a pulse of wave energy simultaneously launched into an ideal guide in two different modes would arrive at the output end of the guide as two pulses, separated in time by an interval proportional to the length of the guide, the same pulse propagating along a guide in which mode coupling is deliberately enhanced would arrive as a single, slightly broadened pulse.

In the case of optical fiber waveguides, the controlled mode coupling imperfections typically include spatially periodic perturbations of the cross-sectional dimensions of the fiber, of the refractive index of the fiber, and of the straightness of the fiber axis. The techniques proposed heretofore for achieving these imperfections in optical fibers can be divided generally into two classes. In the first class, the desired imperfections are introduced during or after fabrication of the fiber using some sort of external arrangement to perturb the fiber parameters. For example, in U.S. Pat. No. 3,687,514, imperfections are illustratively introduced as the fiber is drawn from an enlarged preform by modulating the velocity at which, or the direction through which, the fiber is drawn. One or more piezoelectric members selectively energized by input signals from a filtered noise source are used to move the preform selectively to produce diameter changes or changes in the direction of the fiber axis. Also, the copending application of H. M. Presby, Ser. No. 479,820, filed June 17, 1974 and assigned to the assignee hereof, the diameter and axial alignment of an optical fiber are varied by means of one or more gas streams directed against the fiber as it is being drawn and while it is still relatively molten.

In the second class of techniques, the desired imperfections are introduced into the fiber preform itself before the fiber is drawn therefrom. Examples of this second class of techniques are described in the copending application of D. Marcuse, Ser. No. 522,435, filed Nov. 11, 1974 and assigned to the assignee hereof. Generally, in these techniques, one programs the preform doping process or the preform material deposition process so as to yield perturbations in the preform refractive index or cross-sectional size. The fiber, upon being pulled from such a preform, inherently includes mode coupling perturbations.

SUMMARY OF THE INVENTION

The present invention is directed to an alternative class of optical fiber waveguiding structures and fabrication techniques which provide reduced modal dispersion as a result of the deliberate enhancement of mode coupling in the fibers. In contrast to the above-described dispersion-reducing techniques, which incorporate mode coupling perturbations in some manner or another into the body of the fiber waveguide itself, the present invention makes use of an enveloping outer jacket to supply mode coupling perturbations to the fibers. Fiber jackets, which are typically composed of thermoplastic materials and which are used conventionally to provide a protective shielding to fiber waveguides, are selectively deformed according to the present invention so as to modify the straightness of the fiber axes and thereby to cause the desired mode coupling. Since, with the structures and techniques of the present invention, the outer jacket provides the mode coupling perturbations, the fiber waveguides can be fabricated using standard techniques without the need for any complicated procedures or apparatus for modifying the fiber parameters. Additionally, standard fiber jacketing techniques such as extrusion and lamination can be used to combine the outer jacket with the fibers. The outer jacket is appropriately deformed either before, after or while it is combined with the fiber waveguides using any one of the relatively simple techniques of the invention described illustratively hereinbelow.

Advantageously, the various techniques of the invention can be used to introduce mode coupling either in single fiber structures or in fiber group structures which include a plurality of fiber waveguides held together in a common outer jacket. An example of the latter type of structure is the fiber ribbon or tape configuration, in which several fiber waveguides are held in a linear array in spaced-apart parallel positions in a ribbon-like plastic jacket. Each of the various techniques of the invention is designed to allow the economic and reliable manufacture of large lengths of such structures with the desired mode coupling.

In the first illustrative technique of the invention, mode coupling perturbations are provided simply by continuously passing an unperturbed jacketed fiber structure through a pair of specially designed rollers. At least one of the two rollers is heated to a temperature sufficient to soften the material of the fiber jacket and includes a corrugated outer surface having spatial periodicities equal to those to be imparted to the structure. As the fiber structure is continuously fed through the assembly, the corrugated roller imparts a series of bending deformations to the fiber jacket which vary in magnitude periodically along the longitudinal axis of the structure. These bends tend to alter the straightness of the included fibers and to yield the desired mode coupling.

In a second illustrative technique of the invention, a similar heat deforming process is employed. An unperturbed jacketed fiber structure is continuously passed by a heating element, such as a hot wire, which is positioned a short distance away from the passing structure and which is oriented orthogonal to the longitudinal axis of the structure. The hot wire has a temperature sufficient to soften the material of the fiber jacket. As the structure is moved by the hot wire, the separation between the hot wire and the jacket is varied. The closer the hot wire comes to the jacket, the larger the buckling deformation that is induced therein. By properly selecting the modulation rate of the hot wire-jacket separation relative to the rate at which the structure is moved by the hot wire, the desired spatial variations in the straightness of the fiber axis are achieved.

In a third illustrative technique of the invention, a jacketed fiber structure is continuously passed through an apparatus which tightly wraps a thin strand or thread around the outer surface of the structure. This technique is particularly suited for introducing mode coupling in single fiber structures. Because the structure is continuously moved through the apparatus, the strand is deposited in an essentially helical path about the structure. Because the strand is applied under sustained tension, the fiber structure is forced to bend causing a corresponding variation in the straightness of the fiber axis. By varying the speed at which the structure passes through the wrapping apparatus and/or the wrapping rate, the form of the mode coupling perturbations can be conveniently adjusted.

In a fourth illustrative technique of the invention, the jacket materials are appropriately deformed prior to being combined with the fiber waveguides. This technique is particularly suited for the fabrication of low dispersion optical fiber ribbons. A pair of plastic laminate sheets are first periodically deformed using a technique such as the first or second illustrative techniques of the invention mentioned above. These predeformed sheets are then joined together with a plurality of spaced-apart fiber waveguides between them using a lamination process. Since the fiber waveguides tend to conform to the predeformed contours of the laminate sheets in the resulting structure, suitable perturbations for the fiber straightness are achieved.

BRIEF DESCRIPTION OF THE DRAWING

The foregoing and other features and advantages of the invention will be better understood from the following detailed description taken in conjunction with the accompanying drawing in which.

Figure 1:
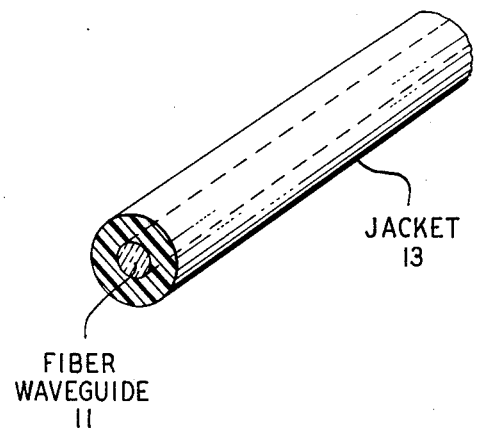
FIG. 1 is a perspective view of a conventional single fiber waveguide structure which is protected by a plastic outer jacket.

The various figures of the drawing are not necessarily drawn to scale or to relative dimensions.

DETAILED DESCRIPTION

In FIG. 1, there is shown a single fiber structure comprised of an optical fiber waveguide 11 embedded in protective jacket 13. Fiber waveguide 11 is a multimode fiber waveguide and may have any of the presently known fiber waveguiding configurations. In the most usual case, fiber waveguide 11 consists of an inner core surrounded by an outer cladding of a lower refractive index than that of the core so that the propagating wave energy is confined essentially within the inner core region of the fiber. Fiber waveguide 11 may nevertheless be uncladded, and the core thereof may have an index of refraction which varies radially e.g., is radially graded from a maximum value existing on the central axis of the fiber. Typically, fiber waveguide 11 is formed of one or more low optical loss amorphous compositions such as fused silica or glass.

Protective jacket 13 may be added to fiber waveguide 11 using any of the presently known fiber jacketing techniques. Techniques such as dipping and extrusion have been used successfully to coat individual fibers. Typically, jacket 13 is formed of one or more layers of thermoplastic materials such as nylon or polyvinylchloride. It may be tightly fitted to the fiber, as shown in FIG. 1, or loosely fitted so that the fiber is free to float within the jacket.

Figure 2:
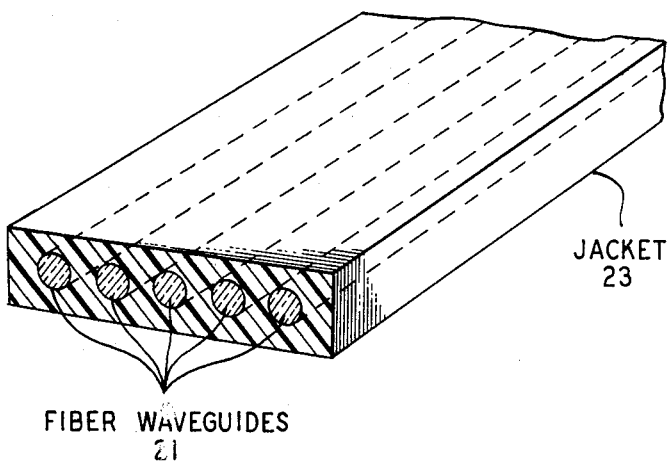
FIG. 2 is a perspective view of a conventional fiber ribbon structure which includes a plurality of fiber waveguides held in a linear array by a common plastic jacket.

FIG. 2 of the drawing shows a conventional optical fiber ribbon structure. A plurality of fiber waveguides, all denoted 21, are held in a linear array in spaced-apart parallel positions by ribbon-like outer jacket 23. Fiber waveguides 21, like fiber waveguide 11, may have any of the presently known configurations. Jacket 23, like jacket 13, is typically formed of a thermoplastic material, and may include multiple layers of different thermoplastic materials. Techniques such as extrusion and lamination are customarily used to fabricate ribbon structures of the type shown in FIG. 2. For purposes of simplicity, five fiber waveguides 21 are shown in the ribbon of FIG. 2. Obviously, more or fewer fiber waveguides could be included.

Jackets such as jacket 13 shown in FIG. 1 and jacket 23 shown in FIG. 2 have been employed in the prior art primarily for the purpose of providing some degree of fiber waveguide protection. Such jackets have been found to be useful in providing a seal against hostile environmental substances, in reducing fiber abrasion by preventing fiber contact, and in providing shielding against perturbing external forces. The present invention conveniently makes additional use of the fiber jackets as a means for deliberately enhancing coupling among the various propagating modes in the fibers and hence reducing multimode dispersion. The techniques of the invention involve selectively heating or otherwise deforming the fiber jacket around each fiber waveguide so as to provide axial directional changes therein. The desired mode coupling occurs in each fiber, provided the spatial periodicities of the axial changes are properly selected.

The selection of the proper spatial periodicities for the fiber axial perturbations is made in accordance with the theory set forth in articles by D. Marcuse and D. Marcuse and R. M. Derosier, respectively, in Volume 48 of *The Bell System Technical Journal*, pages 3187 through 3232 (December 1969). As discussed in these articles, in a multimode waveguide, there is a distribution of discrete guided modes having phase constants starting at $\beta_1 = n_1 k$ (where $n_1$ is the refractive index of the fiber core and $k = 2\pi/\lambda$ where $\lambda$ is the free-space wavelength of the light to be guided), and decreasing in value to $\beta_2, \beta_3, \ldots \beta_n$, respectively. Hence, $\beta_1$ is the phase constant of the lowest order guided mode, while $\beta_n$ is the phase constant of the highest order guided mode, and $\beta_1 > \beta_n$. There is, in addition, a continuum of radiation modes starting at phase constant $\beta_r = n_2 k$ that is less in value than the phase constants of the guided modes (where $n_2$ is the refractive index of the fiber cladding), and decreasing continuously in value therefrom. In order to couple from lower order guided mode (e.g., $\beta_m$) to a higher order guided mode (e.g., $\beta_n$), the spatial periodicity $\Lambda$ of the induced perturbation is selected to be approximately equal to beat wavelength $\lambda_b$ of the two modes as follows:

$$\Lambda = \lambda_b = \frac{2\pi}{\beta_m - \beta_n}. \quad (1)$$

Typically, a spectrum of spatial periodicities $\Lambda$ is used which includes a component at the beat wavelength $\lambda_b$ of the two modes to be coupled, and which includes many other components. Coupling among all guided modes in the fiber is achieved by selecting a spectrum of spatial periodicities $\Lambda$ including components at the respective beat wavelength between each of the guided modes of the fiber.

Although the respective phase constants for the individual guided modes in a multimode fiber depend upon the specific fiber dimensions, the relative refractive indices, and the wavelength of the propagating light, the spatial periodicities $\Lambda$ necessary for inducing guided mode coupling in a fiber typically range in value from about 0.5 to 20 millimeters (mm). As a specific numerical example of the selection of appropriate spatial periodicities for the mode coupling perturbations, consider a fiber having an inner core diameter of about 50 micrometers ($\mu$m), a core index of 1.5, and a core-cladding index difference of 1 percent. Then, at a wavelength of 1 $\mu$m, the spatial periodicities for coupling between adjacent lowest order modes is $\sim$ 19 mm and for adjacent modes near cut-off is $\sim$ 0.7. Axial perturbations having spatial periodicities ranging from about 0.7 to 19 mm would thus be suitable for providing coupling among most of the guided modes in the fiber.

Figure 3:
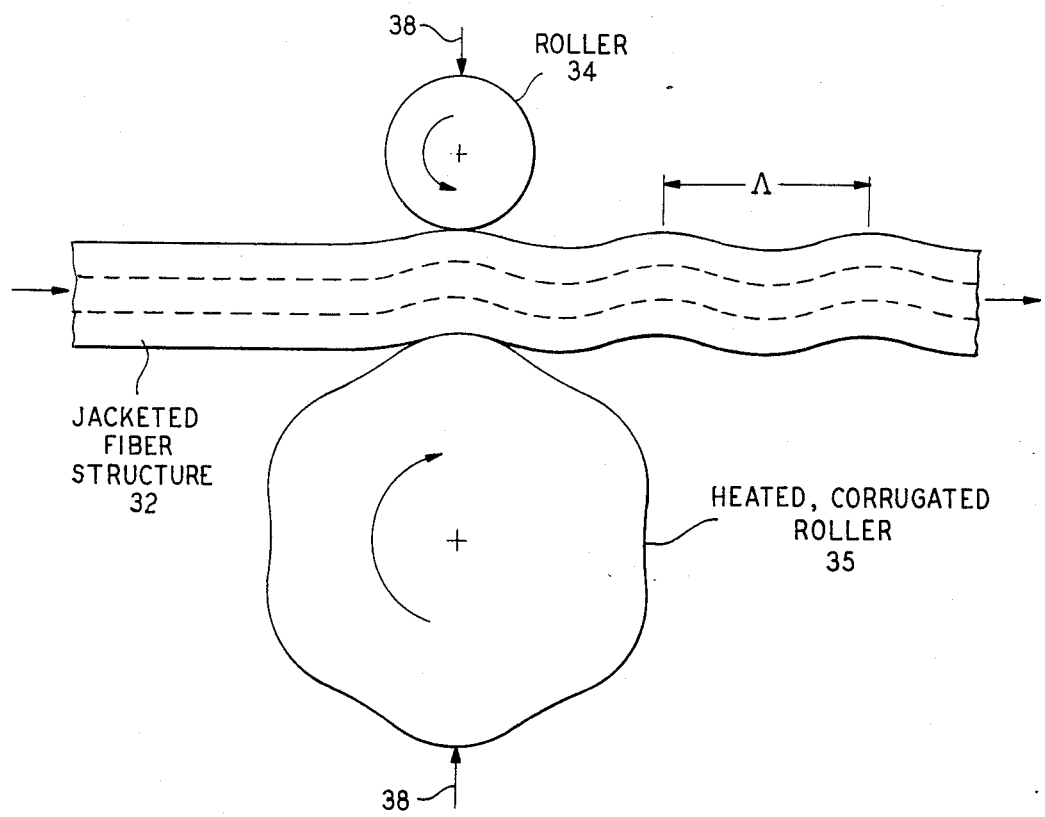
FIGS. 3 through 6 are schematic views of arrangements for producing axial directional changes in a jacketed fiber structure in accordance with the various illustrative techniques of the invention.

FIG. 3 of the drawing illustrates schematically an arrangement for imparting axial directional changes to a jacketed fiber structure in accordance with a first illustrative technique of the invention. As shown in FIG. 3, an unperturbed plastic jacketed fiber structure 32 is continuously passed or pulled (e.g., from left to right in the figure) through a pair of rollers 34 and 35. Structure 32 is illustratively either a single fiber structure of the type shown in FIG. 1 or a fiber ribbon structure of the type shown in FIG. 2. Rollers 34 and 35 are designed to deform the jacket of structure 32 and, in doing so, to provide axial directional changes to the fiber(s) of the structure. Illustratively, roller 34 has a smooth and flat outer surface and is maintained at ambient temperature, while roller 35 has a corrugated outer surface and is heated to a temperature sufficient to soften the material of the jacket of structure 32. A slight squeezing pressure is illustratively exerted by rollers 34 and 35 in the direction of arrows. Roller 35 gives rise to heating of the lower surface of the plastic jacket and nonuniform pressure which causes the jacket, and the fiber(s) included therein, to buckle. This buckling occurs along the length of the structure and follows the form of the corrugations in the outer surface of roller 35. The form of the corrugations is selected to provide the desired spatial periodicities to the fiber axial perturbations (e.g., in the range of about 0.5 to 20 mm).

The appropriate spectrum of spatial periodicities can be incorporated into corrugations of the outer surface of roller 35 using an appropriately programmed surface machining process to fabricate the roller. In such a case, only a single set of rollers need be used to provide the desired mode coupling perturbations to the structure, as illustrated in FIG. 3. Alternatively, a plurality of sets of rollers could be distributed along the structure length. Each of the lower rollers in the sets could then include surface corrugations of different spatial periodicities within the overall spectrum of guided mode coupling. As the structure is passed through the successive sets of rollers, the different spatial periodicities would be superimposed on the fiber(s).

Figure 4:
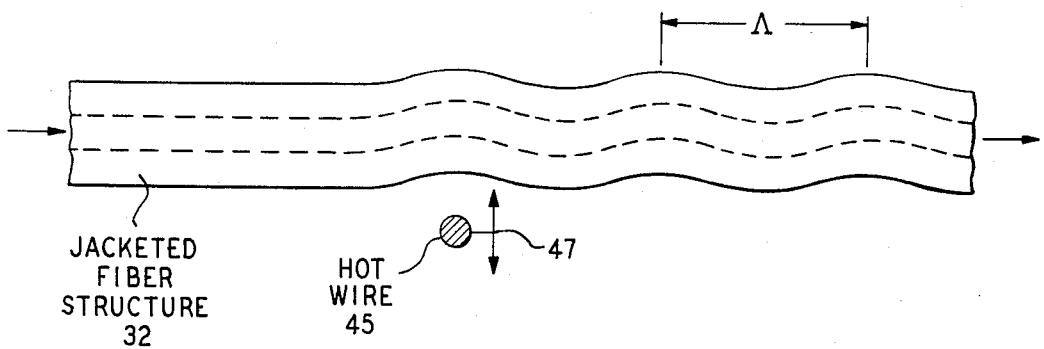

FIG. 4 illustrates the operation of a second illustrative technique of the invention. Like the technique shown in FIG. 3, a heat deforming process is used to deform the jacket of structure 32 periodically along its length. Instead of using a corrugated roller arrangement, however, a discrete heating element such as hot wire 45 is employed. Hot wire 45 is heated to a temperature sufficient to soften the material of the jacket of structure 32. The wire is disposed a short distance away from the structure and is illustratively oriented orthogonal to the direction of movement thereof (e.g., into the plane of the figure). As indicated by arrows 47, the separation between hot wire 45 and structure 32 is modulated periodically back and forth as structure 32 passes. When wire 45 is sufficiently close to structure 32, it gives rise to nonuniform heating thereof. Thus, modulating the separation between wire 45 and structure 32 modulates the straightness of the jacket and the included fiber(s). Conveniently, with this technique, one can vary the spatial periodicity $\Lambda$ of the induced axial directional changes by varying the modulation rate of the hot wire structure separation relative to the rate at which the structure is passed by the hot wire. Thus, successive lengths of structure 32 can be fabricated with different spatial periodicities within the overall spectrum for guided mode coupling.

Figure 5:
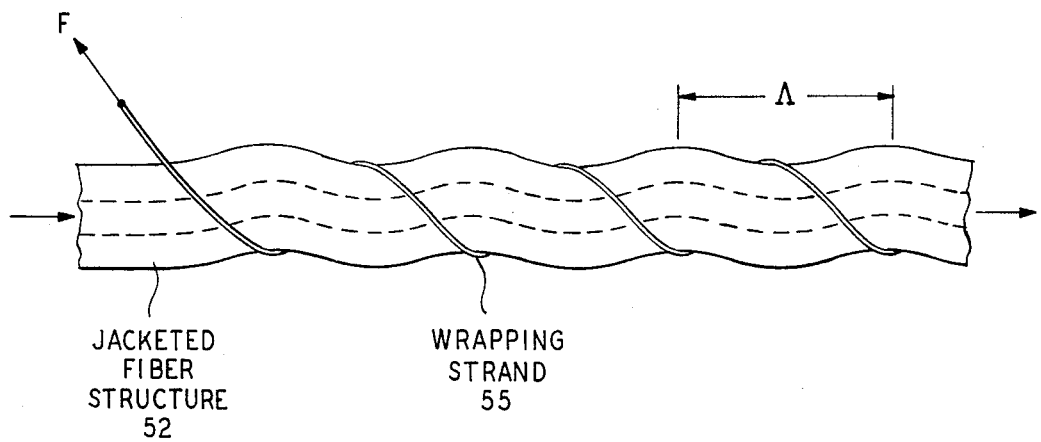

The technique illustrated by FIG. 5 of the drawing is particularly suited for the introduction of mode coupling pursuant to the invention in single fiber structures. Thus, jacketed fiber structure 52 is illustratively of the type shown in FIG. 1. The desired axial directional changes are achieved in this technique by tightly wrapping a thin continuous strand or thread 55 of high strength material, such as glass, graphite, graphite reinforced plastic or steel, helically around the outer surface of the jacket of structure 52. As with the above-described techniques, the fiber structure in this technique is preferably continuously advanced, as a final step in the structure fabrication process, through suitable apparatus for providing the desired axial directional changes. In this case, suitable apparatus, not shown in FIG. 5 for ease of illustration, could take the form of an annular disc which is positioned so that structure 52 can be passed through its center and which rotates about an axis which is parallel to the direction of movement of the structure. The outer edge of the disc would include at least one strand guide through which strand 55 is fed and wrapped about structure 52. The desired amount of tension F can be applied to strand 55 by a variable torque motor attached to a feeding reel upon which strand 55 is stored. Because strand 55 is applied to structure 52 under sustained tension, the structure and the fiber included therein is forced to bend a small amount toward the direction of the applied tension. Since the direction of the applied tension continuously varies about the structure (e.g., as the annular disc is continuously rotated), a helical variation in the straightness of the included fiber results. The spatial periodicity Λ of the variation can be adjusted by varying the strand wrapping rate relative to the speed at which the structure passes through the wrapping apparatus. As with the technique of FIG. 4, successive lengths of structure 52 can be fabricated to have different spatial periodicities within the overall spectrum for guided mode coupling.

Figure 6:
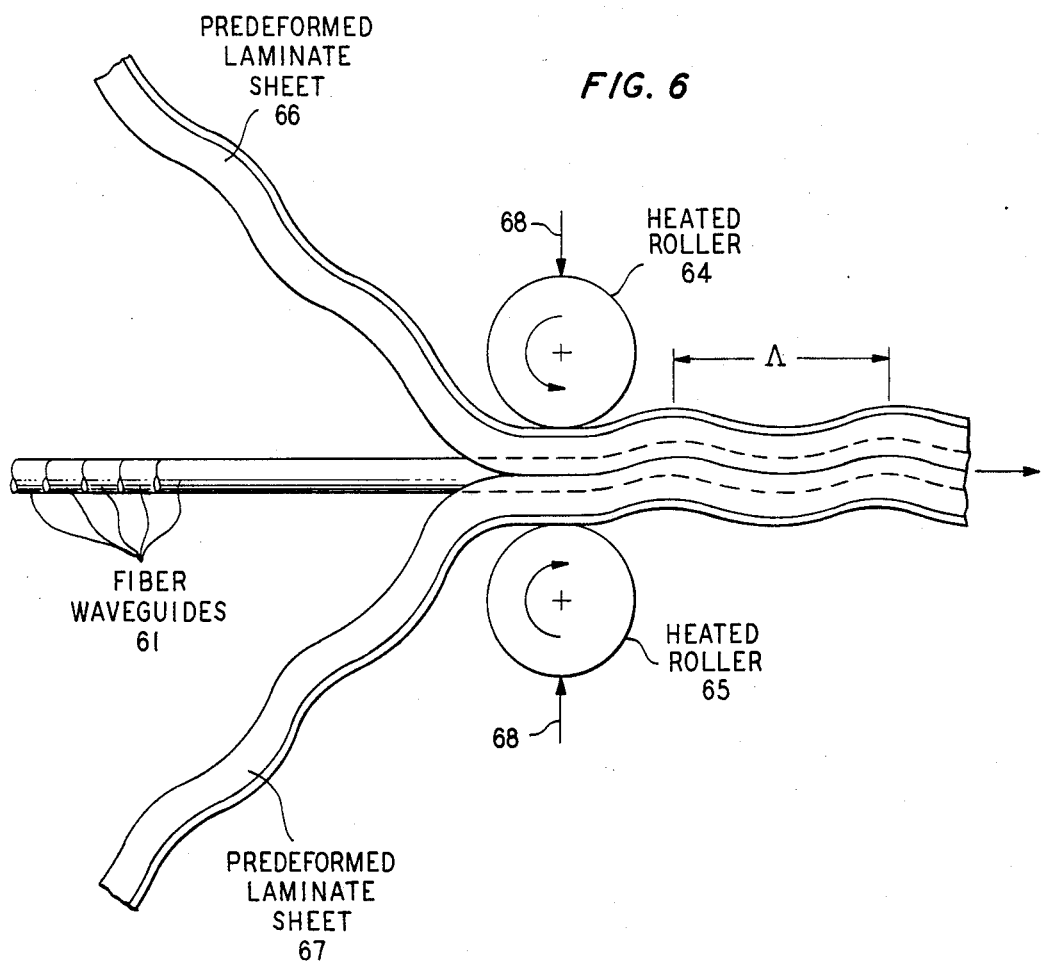

FIG. 6 of the drawing illustrates the operation of a technique which allows an alternate approach to the fabrication of low dispersion fiber structures pursuant to the invention. In this technique, the respective elements of which the protective outer jacket is composed are selectively deformed prior to combining them with the fiber waveguides in the structure. A lamination process is used to combine the predeformed jacket elements with the fiber waveguides, which makes this technique ideally suited for the production of low dispersion optical fiber ribbon structures.

In FIG. 6, upper and lower sheets of predeformed plastic laminate material 66 and 67 are fed into the space between a pair of opposing, heated rollers 64 and 65. A plurality of fiber waveguides 61 are fed in a spaced-apart linear array between sheets 66 and 67. Sheets 66 and 67 are each illustratively comprised of two layers of plastic. The inner layers consist of a plastic which, when heated, will soften and flow under pressure and which, when allowed to cool, will adhere securely to the outer surface of fibers 61. The outer layers of laminate sheets 66 and 67 are securely bonded to the inner layers and are illustratively formed of a much more rigid, higher softening point plastic than that of the inner layers. As the assembly is passed through rollers 64 and 65, the inner layers of laminate sheets 66 and 67 deform around fiber waveguides 61. A slight squeezing pressure exerted by rollers 64 and 65 in the direction of arrows 68 assists the process. The outer layers of sheets 66 and 67 may be temporarily flattened by rollers 64 and 65 but, because of their more rigid, more stable properties, they tend to reassume their predeformed shape upon passing through the rollers. In the process, fibers 61 are forced to conform at least partially to the predeformed contours of the outer layers. The desired axial directional changes are thus achieved in the fibers provided the spatial periodicity Λ of the predeformed contours in laminate sheets 66 and 67 are properly selected.

Techniques such as those illustrated by FIGS. 3 and 4 of the drawing may be used to predeform the outer layers of laminate sheets 66 and 67. Preferably, the outer layers would be predeformed using one of these techniques prior to bonding the inner layers of the softer, lower softening point plastic thereto. Suitable materials for laminate sheets 66 and 67 would include polyethylene for the inner layers thereof, and mylar for the outer layers.

It should be understood that the above-described embodiments and techniques are illustrative of but a few of the many possible specific embodiments and techniques which represent applications of the principles of the invention, as defined by the appended claims. For example, in the technique illustrated by FIG. 6, roller 65 could include surface corrugations of the type included in roller 35 of FIG. 3 so that laminate sheets 66 and 67 are appropriately deformed while they are combined the fiber waveguides to form the desired final structure.

What is claimed is:

1. An optical fiber waveguiding structure including at least one optical fiber waveguide having a longitudinal axis, core and cladding regions and being capable of guiding optical wave energy along said axis in a plurality of different modes of wave propagation having different group velocities, said structure further including means for reducing dispersion due to said difference in group velocities comprising means for enhancing coupling among said modes in said fiber, said structure being characterized in that said mode coupling means comprises an outer jacket enveloping said fiber, said outer jacket being selectively deformed so as to modify the straightness of said fiber axis in a spatially periodic manner effective in providing said mode coupling.

2. The optical fiber waveguiding structure of claim 1 in which said outer jacket is formed of one or more thermoplastic materials capable of being deformed in said spatially periodic manner by the selective application of heat thereto.

3. The optical fiber waveguiding structure of claim 1 including a plurality of optical fiber waveguides enveloped in a linear array in spaced-apart parallel positions in said outer jacket, said outer jacket being deformed so as to modify the straightness of said fiber axis of each of said fibers in said spatially periodic manner.

* * * * *